US 7,893,011 B2

(12) United States Patent
Lewis et al.

(10) Patent No.: US 7,893,011 B2
(45) Date of Patent: *Feb. 22, 2011

(54) COMPOSITIONS COMPRISING SOREL CEMENTS AND OIL BASED FLUIDS

(75) Inventors: Sam Lewis, Duncan, OK (US); Chris Gordon, Duncan, OK (US); Mike Szymanski, Duncan, OK (US)

(73) Assignee: Halliburton Energy Services Inc., Duncan, OK (US)

( * ) Notice: Subject to any disclaimer, the term of this patent is extended or adjusted under 35 U.S.C. 154(b) by 298 days.

This patent is subject to a terminal disclaimer.

(21) Appl. No.: 11/622,354

(22) Filed: Jan. 11, 2007

(65) Prior Publication Data

US 2008/0171673 A1    Jul. 17, 2008

(51) Int. Cl.
C09K 8/60 (2006.01)
C09K 8/36 (2006.01)
C09K 8/68 (2006.01)
E21B 33/13 (2006.01)
E21B 43/27 (2006.01)
E21B 43/26 (2006.01)

(52) U.S. Cl. .................. 507/240; 507/129; 507/200; 166/293; 166/300; 166/308

(58) Field of Classification Search ........... 166/293, 166/300, 308; 507/240, 129, 200
See application file for complete search history.

(56) References Cited

U.S. PATENT DOCUMENTS

| 3,389,751 | A | * | 6/1968 | Harnsberger ................ 166/276 |
| 3,887,009 | A | | 6/1975 | Miller et al. |
| 4,174,229 | A | | 11/1979 | Boberski et al. |
| 5,058,679 | A | | 10/1991 | Hale et al. |
| 5,213,161 | A | | 5/1993 | King et al. |
| 5,220,960 | A | | 6/1993 | Totten et al. |
| 5,281,270 | A | | 1/1994 | Totten et al. |
| 5,284,513 | A | | 2/1994 | Cowan et al. |
| 5,298,069 | A | | 3/1994 | King et al. |
| 5,330,006 | A | * | 7/1994 | Nahm et al. ................ 166/293 |
| 5,403,822 | A | | 4/1995 | Mueller et al. |
| 5,913,364 | A | | 6/1999 | Sweatman |
| 5,977,030 | A | | 11/1999 | House |
| 6,167,967 | B1 | | 1/2001 | Sweatman |
| 6,258,757 | B1 | | 7/2001 | Sweatman |
| 6,390,195 | B1 | | 5/2002 | Nguyen et al. |
| 6,561,273 | B2 | | 5/2003 | Brothers et al. |
| 6,592,660 | B2 | | 7/2003 | Nguyen et al. |
| 6,616,751 | B1 | | 9/2003 | Maroy et al. |
| 6,664,215 | B1 | | 12/2003 | Tomlinson |
| 6,887,832 | B2 | | 5/2005 | Kirsner et al. |
| 7,044,222 | B2 | | 5/2006 | Tomlinson |
| 7,687,440 | B2 | | 3/2010 | Reddy et al. |

| 2003/0144153 | A1 | | 7/2003 | Kirsner et al. |
| 2004/0052748 | A1 | | 3/2004 | Vondruska |
| 2004/0147404 | A1 | | 7/2004 | Thaemlitz et al. |
| 2005/0032652 | A1 | | 2/2005 | Kirsner et al. |
| 2005/0241828 | A1 | | 11/2005 | Almond et al. |
| 2006/0122071 | A1 | | 6/2006 | Reddy et al. |
| 2006/0166839 | A1 | | 7/2006 | Miller |
| 2006/0169454 | A1 | | 8/2006 | Savery et al. |
| 2007/0125276 | A1 | * | 6/2007 | Reddy et al. ................ 106/689 |
| 2007/0125534 | A1 | | 6/2007 | Reddy et al. |
| 2007/0125542 | A1 | | 6/2007 | Wei et al. |

FOREIGN PATENT DOCUMENTS

GB          897895 A       5/1962
WO     2007063317 A1       6/2007

OTHER PUBLICATIONS

Hewlett, Peter C.; "Lea's Chemistry of Cement and Concrete"; Fourth Edition; Elsevier Publishing; 1998; pp. 813-820 and cover.

Flex Plug Service, For Curing Lost Circulation, Improving Wellbore Pressure Containment and Drilling Ahead, by Halliburton Communications, Jul. 2005.

Thermatek Service, Helps Meet the Challenges of Severe Lost Circulation, Near Wellbore Water Shutoffs and Plugging Operations, by Halliburton Communications, May 2005.

SPE 66553, New Low Viscosity Ester is Suitable for Drilling Fluids in Deepwater Applicationsm, by Kim Burrows, et al. Copyright 2001.

U.S. Appl. No. 11/622,357, filed Jan. 11, 2007, Compositions Comprising Quaternary Material & Sorel Cements, by Sam Lewis, et al.

(Continued)

Primary Examiner—Timothy J. Kugel
Assistant Examiner—Aiqun Li
(74) Attorney, Agent, or Firm—Craig W. Roddy; Conley Rose, P.C.

(57) ABSTRACT

A wellbore servicing composition comprising a metal oxide, a soluble salt, a surfactant and an oleaginous fluid. A wellbore servicing composition comprising magnesium oxide, a chloride or phosphate salt, an organophilic surfactant and an oleaginous fluid. A wellbore servicing composition comprising magnesium oxide, magnesium chloride, an organophilic surfactant, water and an oleaginous fluid wherein the organophilic surfactant is present in an amount of from about 0.25% to about 5% base on the combined weight of the magnesium oxide and magnesium chloride, and the oleaginous fluid is present ratio of from about 95:5 cement:oleaginous fluid to about 50:50 cement:oleaginous fluid.

21 Claims, No Drawings

OTHER PUBLICATIONS

U.S. Appl. No. 11/622,356, filed Jan. 11, 2007, Methods of Servicing a Wellbore with Compositions Comprising Quaternary Material and Sorel Cements, by Sam Lewis, et al.
U.S. Appl. No. 11/622,348, filed Jan. 11, 2007, Methods of Servicing a Wellbore with Compositions Sorel Cements and Oil Based Fluids, by Sam Lewis, et al.
Halliburton Brochure: "Accolade High-Performance Synthethic-Based Fluids from Baroid" dated Aug. 2006.
Halliburton Brochure: "Flexplug OBM Lost-Circulation Material" dated Oct. 2005.
Halliburton Brochure: "Flexplug W Lost-Circulation Material" dated Oct. 2005.
Halliburton MSDS Sheet: R-TEK dated Feb. 6, 2004.
Halliburton MSDS Sheet: C-TEK dated Jan. 7, 2004.
Final Office Action dated Mar. 19, 2008 (19 pages), U.S. Appl. No. 11/622,356, filed Jan. 11, 2007.
Notice of Allowance dated Jan. 24, 2008 (4 pages), U.S. Appl. No. 11/622,348, filed Jan. 11, 2007.
Advisory Action dated Jun. 2, 2008 (3 pages), U.S. Appl. No. 11/622,356, filed Jan. 11, 2007.
Todd, Brad, et al., "An innovative system for complete cleanup of a drill-in fluid filter cake," SPE 86494, 2004, pp. 1-9, Society of Petroleum Engineers Inc.
Vinson, E. F., et al., "Acid removable cement system helps lost circulation in productive zones," IADC/SPE 23929, Feb. 1992, pp. 1-5, IADC/SPE Drilling Conference.
Office Action from U.S. Appl. No. 11/622,348 dated Jul. 19, 2007.
Foreign communication from a related counterpart application—International Search Report and Written Opinion, PCT/GB2007/005007, Jun. 27, 2008, 12 pages.
Notice of Allowance dated Jul. 28, 2008 (7 pages), U.S. Appl. No. 11/622,356, filed Jan. 11, 2007.
Foreign communication from a related counterpart application—International Search Report and Written Opinion, PCT/GB2008/000026, Jul. 4, 2008, 10 pages.
Office Action dated Sep. 18, 2007 (26 pages), U.S. Appl. No. 11/622,356, filed Jan. 11, 2007.
Office Action dated Apr. 14, 2009 (32 pages), U.S. Appl. No. 11/622,357, filed Jan. 11, 2007.
Office Action dated Sep. 11, 2009 (13 pages), U.S. Appl. No. 11/622,357, filed Jan. 11, 2007.
Stepan Company product data sheet, AMMONYX® SDBC, 2009, 1 page, Stepan Company.
Office Action (Final) dated Mar. 23, 2010 (19 pages), U.S. Appl. No. 11/622,357, filed Jan. 11, 2007.

* cited by examiner

COMPOSITIONS COMPRISING SOREL CEMENTS AND OIL BASED FLUIDS

CROSS-REFERENCE TO RELATED APPLICATIONS

The subject matter of the present application is related to U.S. patent application Ser. No. 11/622,348 filed Jan. 11, 2007 and entitled "Methods of Servicing a Wellbore with Compositions Comprising Sorel Cements and Oil Based Fluids," now U.S. Pat. No. 7,350,575, and Ser. No. 11/622,356 filed Jan. 11, 2007 and entitled "Methods of Servicing Wellbore with Compositions Comprising Quaternary Material and Sorel Cements," now U.S. Pat. No. 7,431,086, and Ser. No. 11/622,357 filed Jan. 11, 2007 and entitled "Compositions Comprising Quaternary Material and Sorel Cements," now U.S. Published Application U.S. 2008/0171674 A1, each of which is hereby incorporated herein by reference in its entirety for all purposes.

STATEMENT REGARDING FEDERALLY SPONSORED RESEARCH OR DEVELOPMENT

Not applicable.

BACKGROUND OF THE INVENTION

1. Field of the Invention

The present disclosure generally relates to well cementing, and more particularly to compositions comprising a Sorel type cement, a surfactant and an oleaginous fluid and methods of using same.

2. Background of the Invention

Natural resources such as gas, oil, and water residing in a subterranean formation or zone are usually recovered by drilling a wellbore down to the subterranean formation while circulating a drilling fluid in the wellbore. After terminating the circulation of the drilling fluid, a string of pipe, e.g., casing, is run in the wellbore. The drilling fluid is then usually circulated downward through the interior of the pipe and upward through the annulus, which is located between the exterior of the pipe and the walls of the wellbore. Next, primary cementing is typically performed whereby a cement slurry is placed in the annulus and permitted to set into a hard mass (i.e., sheath) to thereby attach the string of pipe to the walls of the wellbore and seal the annulus. The main objectives of primary cementing operations include zonal isolation to prevent migration of fluids in the annulus, support for the casing or liner string, and protection of the casing string from corrosive formation fluids. Subsequent secondary cementing operations may also be performed. Secondary or remedial cementing operations are performed to repair primary-cementing problems or to treat conditions arising after the wellbore has been constructed.

Oil or gas residing in the subterranean formation may be recovered by driving fluid into the well using, for example, a pressure gradient that exists between the formation and the wellbore, the force of gravity, displacement of the fluid using a pump or the force of another fluid injected into the well or an adjacent well. The production of fluid in the formation may be increased by hydraulically fracturing the formation. That is, a viscous fracturing fluid may be pumped down the casing to the formation at a rate and a pressure sufficient to form fractures that extend into the formation, providing additional pathways through which the oil or gas can flow to the well. Unfortunately, water rather than oil or gas may eventually be produced by the formation through the fractures therein. To provide for the production of more oil or gas, a fracturing fluid may again be pumped into the formation to form additional fractures therein. However, the previously used fractures first may need to be plugged to prevent the loss of the fracturing fluid into the formation via those fractures.

In addition to the fracturing fluid, other fluids used in servicing a wellbore may also be lost to the subterranean formation while circulating the fluids in the wellbore. In particular, the fluids may enter the subterranean formation via depleted zones, zones of relatively low pressure, lost circulation zones having naturally occurring fractures, weak zones having fracture gradients exceeded by the hydrostatic pressure of the drilling fluid, and so forth. As a result, the service provided by such fluid is more difficult to achieve. For example, a drilling fluid may be lost to the formation, resulting in the circulation of the fluid in the wellbore being too low to allow for further drilling of the wellbore. Also, a secondary cement/sealant composition may be lost to the formation as it is being placed in the wellbore, thereby rendering the secondary operation ineffective in maintaining isolation of the formation.

Lost circulation treatments involving various plugging materials such as walnut hulls, mica and cellophane have been used to prevent or lessen the loss of fluids from wellbores. The disadvantages of such treatments include the potential for damage to subterranean formations as a result of the inability to remove the plugging materials therefrom, and the dislodgement of the plugging materials from highly permeable zones whereby fluid losses subsequently resume. One technique for preventing lost circulation problems has been to temporarily plug voids or permeable zones with Sorel cement compositions. Sorel cement compositions typically comprise magnesium oxide and a chloride or phosphate salt and water which together form for example magnesium oxychloride. Sorel cements can be removed with minimal damage to subterranean zones or formations by dissolution in acids. Sorel cement use has been limited by the fact that formations that are sensitive to water, such as those containing swelling clay and shales, cannot be exposed to water-based wellbore servicing fluids such as a Sorel cement because of the potential for sloughing of the formation material into the wellbore. Consequently, such wellbores are typically drilled with oleaginous fluids such as oil-based drilling fluids. Thus it would be desirable to develop Sorel cement compositions that are compatible with oleaginous fluids.

BRIEF SUMMARY OF SOME OF THE PREFERRED EMBODIMENTS

Disclosed herein is a wellbore servicing composition comprising a metal oxide, a soluble salt, a surfactant and an oleaginous fluid.

Also disclosed herein is a wellbore servicing composition comprising magnesium oxide, a chloride or phosphate salt, an organophilic surfactant and an oleaginous fluid.

Further disclosed herein is a wellbore servicing composition comprising magnesium oxide, magnesium chloride, an organophilic surfactant, water and an oleaginous fluid wherein the organophilic surfactant is present in an amount of from about 0.25% to about 5% base on the combined weight of the magnesium oxide and magnesium chloride, and the oleaginous fluid is present ratio of from about 95:5 cement:oleaginous fluid to about 50:50 cement:oleaginous fluid.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

DETAILED DESCRIPTION OF THE PREFERRED EMBODIMENTS

Disclosed herein are wellbore servicing fluids comprising a Sorel cement, a surfactant, and an oleaginous fluid and methods of using same. In various embodiments, Sorel cements comprise a metal oxide such as magnesium oxide and a soluble salt such as a chloride or phosphate salt. A discussion of various magnesia-based cements can be found in Lea's *Chemistry of Cement and Concrete* by Peter Hewlett: Fourth Edition, pages 813-820: 1998: Elsevier Publishing which is incorporated by reference herein. Such fluids may be placed into a wellbore and allowed to set and form a rigid mass having an appreciable compressive strength. Each of the components of the wellbore servicing fluid disclosed herein will be described in more detail later.

In an embodiment, the Sorel cement comprises a metal oxide, alternatively an alkaline earth metal oxide, alternatively magnesium oxide. In an embodiment, the Sorel cement comprises MgO. MgO may be prepared by calcination of $Mg(OH)_2$ as depicted in Reaction 1:

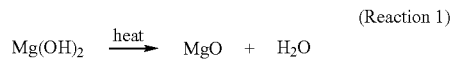

(Reaction 1)

The calcination of $Mg(OH)_2$ results in what is commonly referred to as "burned" MgO. Three basic grades of burned MgO are typically produced with the differences between each grade related to the degree of reactivity remaining after being exposed to a range of high temperatures. The original magnesium hydroxide particle is usually a large and loosely bonded particle. Exposure to thermal degradation by calcination causes the $Mg(OH)_2$ to alter its structure so that the surface pores are slowly filled in while the particle edges become more rounded. This results in MgO with varying degrees of crystallinity and consequently varying degrees of reactivity. When the MgO is produced by calcining to temperatures ranging between 1500° C.-2000° C. the MgO is referred to as "dead-burned" since the majority of the reactivity has been eliminated. Dead-burned MgO has the highest degree of crystallinity of the three grades of burned MgO. An example of a dead-burned MgO includes without limitation THERMATEK™ HT additive which is commercially available from Halliburton Energy Services. A second type of MgO produced by calcining at temperatures ranging from 1000° C.-1500° C. is termed "hard-burned" and displays an intermediate crystallinity and reactivity when compared to the other two grades of burned MgO. An example of a hard-burned MgO includes without limitation THERMATEK™ LT additive which is commercially available from Halliburton Energy Services. The third grade of MgO is produced by calcining at temperatures ranging from 700° C.-1000° C. and is termed "light-burned" or "caustic" magnesia. Light-burned MgO is characterized by a high surface area, a low crystallinity and a high degree of reactivity when compared to the other grades of burned MgO. In embodiments, the MgO for use in a Sorel cement comprises hard-burned MgO, light-burned MgO, dead-burned MgO or combinations thereof.

In an embodiment, the Sorel cement comprises a soluble salt, alternatively a chloride salt, a phosphate salt or combinations thereof. In an embodiment, the Sorel cement comprises an alkaline earth metal chloride, alternatively magnesium chloride ($MgCl_2$), alternatively magnesium chloride hexahydrate, $MgCl_2.6H_2O$. $MgCl_2.6H_2O$ is well known and available from a wide variety of sources. For example, a suitable $MgCl_2.6H_2O$ for use in this disclosure is C-TEK commercially available from Halliburton Energy Services.

In an embodiment, the Sorel cement is formed through contacting MgO with $MgCl_2.6H_2O$ in the presence of other components to be described in more detail later herein. In such an embodiment, the Sorel cement may comprise MgO and $MgCl_2.6H_2O$ present in a ratio of from about 2:1 MgO: $MgCl_2.6H_2O$, alternatively from about 1.5:1 MgO: $MgCl_2.6H_2O$ and, alternatively from about 1:1 MgO: $MgCl_2.6H_2O$. Examples of Sorel cements comprising MgO (e.g., THERMATEK™ HT additive, THERMATEK™ LT additive) and $MgCl_2.6H_2O$ (e.g., C-TEK) include without limitation THERMATEK™ rigid setting fluids commercially available from Halliburton Energy Services.

In another embodiment, the Sorel cement is formed through contacting the MgO with a phosphate salt in the presence of other components to be described in more detail later herein. In such an embodiment, the Sorel cement may comprise MgO and a phosphate salt such as for example potassium phosphate, sodium phosphate, ammonium phosphate or combinations thereof. In such embodiments, the ratio of MgO:phosphate salt may be from about 1:4 alternatively from about 1:3, alternatively from about 1:2, alternatively from about 1:1.

In an embodiment, the Sorel cement, i.e. MgO and $MgCl_2.6H_2O$, comprises a surfactant, alternatively an organophilic surfactant. The surfactant may function to render the Sorel cement organophilic and therefore compatible with an oleaginous fluid of the type disclosed herein. Hereafter compositions comprising a Sorel cement and a surfactant will be referred to as a surfactant Sorel cement composition (SSCC). In an embodiment, the organophilic surfactant may be any organophilic surfactant that is fluid at room temperature and has a fatty acid chain of greater than about $C_{16}$. Alternatively, the organophilic surfactant may comprise a fatty acid chain of $C_{16}$ or greater but is not fluid at room temperature. In such instances, the surfactant may be made fluid at room temperature utilizing techniques known to one of ordinary skill in the art. For example, the surfactant may be heated or combined with an alcohol or alcohol ether such as for example isopropanol or ethylene glycol monobutylether. Examples of surfactants suitable for use in this disclosure include without limitation any surfactant that contains or may be made to contain a permanent or stable quaternary charge, alternatively the surfactant comprises quaternary amides and/or quaternary amide esters such as for example stearamidopropalkonium chloride; tallow amine quarternaries; quarternary imidazolines or combinations thereof.

In an embodiment, the surfactant is present in the SSCC in an amount of from about 0.25% to about 5% based on the weight of the Sorel cement (i.e., the combined weight of MgO and $MgCl_2.6H_2O$), alternatively of from about 0.50% to about 5%, alternatively of from about 1% to about 5%. Without wishing to be limited by theory the use of a surfactant to render the Sorel cement organophilic may allow for the compatibility of the Sorel cement with oleaginous fluids such as those described later herein. The resulting composition may then find expanded utility as a wellbore servicing fluid in difficult drilling situations, such as horizontal or extended drilling, deep wells, and in subterranean formations containing reactive shales.

In an embodiment, the SSCC comprises an oleaginous fluid. Examples of oleaginous fluids suitable for use in this disclosure include without limitation natural oil based muds (OBM), synthetic based muds (SBM), natural base oils, synthetic base oils and invert emulsions. In an embodiment, the SSCC comprises an OBM, alternatively a SBM. OBMs and SBMs typically contain some non-oleaginous fluid such as water, making them water-in-oil type emulsions, also known as invert emulsions wherein a non-oleaginous fluid (e.g. water) comprises the internal phase and an oleaginous fluid comprises the external phase. The non-oleaginous fluid (e.g. water) may arise in the drilling fluid itself or from the well bore, or it may be intentionally added to affect the properties of the drilling fluid. Any known oleaginous fluid may be used to form the external oil phase of the invert emulsion fluid. In an embodiment, the oleaginous fluid comprises any petroleum oil, natural oil, synthetically derived oil, or combinations thereof. Alternatively, the oleaginous fluid comprises at least one of an alpha olefin, an internal olefin, an ester, a diester of carbonic acid, a paraffin, kerosene oil, diesel oil, mineral oil or combinations thereof. Examples of oleaginous fluids suitable for use in this disclosure include without limitation PETROFREE organic carrier fluid, which is an organic ester-based fluid, INVERMUL RF which is an OBM drilling fluid both of which are available from Baroid Drilling Fluids and, ESCAID 110 hydrocarbon fluid which is a petroleum distillate commercially available from EXXON-MOBIL Corp.

In addition, any known non-oleaginous fluid may be used to form the internal phase of the invert emulsion fluid. In an embodiment, the non-oleaginous fluid comprises an aqueous fluid, such as for example tap or fresh water; sea water; naturally-occurring brine; a chloride-based, bromide-based, or formate-based brine containing monovalent and/or polyvalent cations; or combinations thereof. Examples of chloride-based brines include sodium chloride and calcium chloride. Examples of bromide-based brines include sodium bromide, calcium bromide, and zinc bromide. Examples of formate-based brines include sodium formate, potassium formate, and cesium formate.

The Sorel cement (e.g. THERMATEK™ rigid setting fluid which is the MgO and $MgCl_2.6H_2O$ combined) and oleaginous fluid may be present in a ratio of from about 95:5 Sorel cement: oleaginous fluid, alternatively from about 75:25 Sorel cement: oleaginous fluid, alternatively from about 25:75 Sorel cement: oleaginous fluid, alternatively from about 50:50 Sorel cement: oleaginous fluid.

In an embodiment, the SSCC may comprise a retarder or inhibitor. Inhibitors may be used to adjust the time required for setting of the slurry. Such inhibitors may allow the operator to control the set time of the composition based on the geothermal temperature at which the composition will be used. Increasing the weight percentage of the inhibitor will increase the time required for the composition to undergo the phase transition from a slurry to a set mass with appreciable compressive strength. Inhibitors suitable for use in this disclosure include without limitation sodium hexametaphosphate (technical grade granular), potassium magnesium phosphate hexahydrate, potassium magnesium hexametaphosphate or combinations thereof. An example of an inhibitor suitable for use in this disclosure is sodium hexametaphosphate commercially available from Deepearth Solutions under the trademark R-TEK.

In an embodiment, the thickening time of the SSCC may be adjusted through the use of an inhibitor (e.g., sodium hexametaphosphate) such that the composition remains pumpable during downhole placement before rapidly setting. The thickening time refers to the time required for the cement composition to achieve 70 Bearden units of Consistency (Bc). At about 70 Bc, the slurry undergoes a conversion from a pumpable fluid state to a non-pumpable paste. Inhibitors may be present in the SSCC in a range of from about 0.01% to about 10.0% by weight of the magnesium oxide, alternatively from about 0.1% to about 8%, alternatively from about 0.1% to about 6%.

In some embodiments, additives may be included in the SSCC for improving or changing the properties thereof. Examples of such additives include but are not limited to salts, accelerants, viscosifiers, fluid loss agents, weighting materials, dispersants, vitrified shale, formation conditioning agents, or combinations thereof. Other mechanical property modifying additives, for example, carbon fibers, glass fibers, metal fibers, minerals fibers, and the like can be added to further modify the mechanical properties. These additives may be included singularly or in combination. Methods for introducing these additives and their effective amounts are known to one of ordinary skill in the art.

The components of the SSCC may be combined using any mixing device compatible with the composition as known to one of ordinary skill in the art, for example a batch mixer or recirculating mixer.

The SSCC may be placed into a wellbore as a single stream and activated by downhole conditions to form a set rigid mass. In such an embodiment, the SSCC may be placed downhole through the drill bit forming a composition that substantially eliminates lost circulation. In yet another embodiment, the SSCC is formed downhole by the mixing of a first stream comprising one or more SSCC components such as for example MgO and chloride or phosphate salt and a second stream comprising additional SSCC components. Alternatively, the SSCC may be formed downhole by the mixing of a first stream comprising MgO and a second stream comprising the chloride or phosphate salt, surfactant and optional additives. Methods for introducing compositions into a wellbore to seal subterranean zones are described in U.S. Pat. Nos. 5,913,364; 6,167,967; and 6,258,757, each of which is incorporated by reference herein in its entirety.

The SSCCs of this disclosure may develop an appreciable compressive strength when placed downhole. Herein the compressive strength is defined as the capacity of a material to withstand axially directed pushing forces. The maximum resistance of a material to an axial force is determined in accordance with API Recommended Practices 10B, Twenty-Second Edition, December 1997. Beyond the limit of the compressive strength, the material becomes irreversibly deformed and no longer provides structural support and/or zonal isolation. The compressive strength a cement formation attains is a function of both the cement maturity (or cure time) and the temperature at which setting occurs. The cement maturity specifically refers to the time the cement formulation is allowed to set.

In an embodiment, the SSCC may develop a compressive strength of from about 50 psi to about 20,000 psi, alternatively from about 100 psi to about 10,000 psi, alternatively from about 1000 psi to about 10,000 psi. The compressive strength of the SSCC may develop in from about 15 minutes to equal to or greater than about 24 hours, alternatively from about 20 minutes to about 10 hours, alternatively from about 30 minutes to about 8 hours. As will be understood by one of ordinary skill in the art, the compressive strength that develops is directly proportional to the ratio of Sorel cement (e.g. THERMATEK™) to oleaginous fluid. Consequently, increasing the amount of Sorel cement present in the SSCC will result in an increased final compressive strength of the set composition.

The SSCC may have a density from about 4 lb/gallon (ppg) to about 25 ppg, alternatively from about 12 ppg to about 17 ppg, alternatively from about 6 ppg to about 14 ppg. Density reducing additives such as glass beads or foam and expanding additives such as gas, suspension aids, defoamers and the like may be included in the SSCC to generate a lightweight cement slurry. Amounts of such density-reducing additives and methods for their inclusion are known to one of ordinary skill in the art.

The SSCC disclosed herein may be used as a wellbore servicing fluid. As used herein, a "servicing fluid" refers to a fluid used to drill, complete, work over, fracture, repair, or in any way prepare a wellbore for the recovery of materials residing in a subterranean formation penetrated by the wellbore. It is to be understood that "subterranean formation" encompasses both areas below exposed earth and areas below earth covered by water such as ocean or fresh water. Examples of servicing fluids include, but are not limited to cement slurries, drilling fluids or muds, spacer fluids, fracturing fluids or completion fluids, all of which are well known in the art. Without limitation, servicing the wellbore includes positioning the SSCC in the wellbore to isolate the subterranean formation from a portion of the wellbore; to support a conduit in the wellbore; to plug a void or crack in the conduit; to plug a void or crack in a cement sheath disposed in an annulus of the wellbore; to plug an opening between the cement sheath and the conduit; to prevent the loss of aqueous or non-aqueous drilling fluids into loss circulation zones such as a void, vugular zone, or fracture; to be used as a fluid in front of cement slurry in cementing operations; to seal an annulus between the wellbore and an expandable pipe or pipe string; or combinations thereof.

In an embodiment, the SSCC may be introduced to the wellbore to prevent the loss of aqueous or non-aqueous drilling fluids into loss-circulation zones such as voids, vugular zones, and natural or induced fractures while drilling. The SSCC may form a non-flowing, intact mass inside the loss-circulation zone which plugs the zone and inhibits loss of subsequently pumped drilling fluid, which allows for further drilling. For example, the SSCC may function as a plug that is placed into an annulus of the wellbore and prepares the formation for placement of a second (e.g. cementitious) composition.

Alternatively, the SSCC when placed in a wellbore may be allowed to set such that it isolates the subterranean formation from a different portion of the wellbore. The SSCC thus forms a barrier that prevents fluids in that subterranean formation from migrating into other subterranean formations. In an embodiment, the wellbore in which the composition is positioned belongs to a multilateral wellbore configuration. It is to be understood that a multilateral wellbore configuration includes at least two principal wellbores connected by one or more ancillary wellbores.

In an embodiment, the SSCC may serve as a gravel packing fluid in gravel-packing operations. Herein gravel packing refers to a method commonly utilized to prevent migration of sand into wells and to maintain the integrity of subterranean formations. In gravel packing, a permeable screen is placed against the face of a subterranean formation, followed by packing gravel against the exterior of the screen. The size of the gravel particles used for this purpose are larger than the sand particles but are also small enough to ensure that sand cannot pass through voids between the particles. The gravel is typically carried to the subterranean formation by suspending the gravel in a so-called gravel packing fluid and pumping the fluid to the formation. The screen blocks the passage of the gravel but not the fluid into the subterranean formation such that the screen prevents the gravel from being circulated out of the hole, which leaves it in place. The gravel is separated from the fluid as the fluid flows through the screen leaving it deposited on the exterior of the screen.

In an embodiment, the SSCC may be used for plug and abandonment of a well, i.e. to prepare a well to be shut in and permanently isolated. A series of plugs comprising the SSCC may be set in the wellbore and tested at each stage for hydraulic isolation.

In an embodiment, the SSCC may serve as a spot fluid. A spot fluid herein refers to a small volume or pill of fluid placed in a wellbore annulus that may displace another wellbore servicing fluid such as for example a mud. The spot fluid may act as a settable fluid that when used will displace another wellbore servicing fluid from a crack or crevice in the wellbore and solidify to prevent flow of other wellbore servicing fluids into said cracks or crevices.

EXAMPLES

The invention having been generally described, the following examples are given as particular embodiments of the invention and to demonstrate the practice and advantages thereof. It is understood that the examples are given by way of illustration and are not intended to limit the specification of the claims in any manner.

Example 1

The effect of surfactant on a mixture of a Sorel cement and an OBM was investigated. Specifically, the Sorel cement was THERMATEK™ rigid setting fluid which is a mixture of MgO and $MgCl_2.6H_2O$ commercially available from Halliburton Energy Services. A slurry was prepared comprising 95% THERMATEK™ rigid setting fluid and 5% of ARQUAD 83E which is an organophilic surfactant commercially available from Akzo-Nobe. The slurry was then mixed in a 50:50 ratio with either ACCOLADE drilling fluid, PETROFREE organic carrier fluid which is an organic ester-based fluid or, INVERMUL RF which is an OBM drilling fluid all of which are commercially available from Baroid Drilling Fluids a Halliburton Energy Services corporation. The mixtures were allowed to sit at room temperature over a weekend and were hard when next checked. Each mixture set to form a mass with a compressive strength of from about 300 to about 400 psi, showed no signs of separation, free liquid or cracking at room temperature.

Example 2

The effect of surfactant on a mixture of THERMATEK™ rigid setting fluid and a base oil was investigated. A slurry was prepared comprising THERMATEK™ rigid setting fluid and 5% of AMMONYX SDBC which is an organophilic surfactant commercially available from Stepan. The slurry was then mixed in a 50:50 ratio with either diesel, kerosene, or PETROFREE organic carrier fluid. The mixtures were allowed to sit at room temperature over a weekend and were hard when next checked. Each mixture set to form a mass with a compressive strength of from about 300 to about 400 psi, showed no signs of separation, free liquid or cracking at room temperature.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference herein is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A wellbore servicing composition comprising:
   (a) a cementitious material consisting essentially of an alkaline earth metal oxide and a soluble salt, wherein the alkaline earth metal oxide comprises magnesium oxide, wherein the ratio of the alkaline earth metal oxide to the soluble salt is no more than about 2:1 by weight, and wherein formation of a substantially impermeable mass is not inhibited by the cementitious material;
   (b) a surfactant; and
   (c) an oleaginous fluid, wherein upon setting the wellbore servicing composition forms the substantially impermeable mass, wherein the oleaginous fluid is present in a ratio of magnesium oxide and the soluble salt:oleaginous fluid from about 95:5 to about 50:50 by volume.

2. The composition of claim 1 wherein the surfactant comprises an organophilic surfactant.

3. The composition of claim 2 wherein the organophilic surfactant comprises a $C_{16}$ or greater fatty acid moiety.

4. The composition of claim 2 wherein the organophilic surfactant is fluid at room temperature or can be made fluid at room temperature.

5. The composition of claim 2 wherein the organophilic surfactant comprises a quaternary amide, a quaternary amide ester, or combinations thereof.

6. The composition of claim 1 wherein the surfactant is present in an amount of from about 0.25% to about 5% based on the combined weight of the metal oxide and chloride or phosphate salt.

7. The composition of claim 1 wherein the alkaline earth metal oxide comprises magnesium oxide.

8. The composition of claim 1 wherein the soluble salt comprises magnesium chloride, sodium phosphate, potassium phosphate, ammonium phosphate or combinations thereof.

9. The composition of claim 1 wherein the oleaginous fluid comprises petroleum oil, natural oil, synthetically derived oil, or combinations thereof.

10. The composition of claim 1 wherein the oleaginous fluid comprises an alpha olefin, an internal olefin, an ester, a diester of carbonic acid, a paraffin, kerosene oil, diesel oil, mineral oil or combinations thereof.

11. The composition of claim 1 having a compressive strength of from about 50 psi to about 20,000 psi.

12. The composition of claim 1 having a density of from about 4 ppg to about 25 ppg.

13. A wellbore servicing composition comprising:
   (a) a cementitious material consisting essentially of an alkaline earth metal oxide and a chloride or phosphate salt, wherein the alkaline earth metal oxide comprises magnesium oxide, wherein the ratio of the alkaline earth metal oxide to the chloride or phosphate salt is no more than about 2:1 by weight, and wherein formation of a substantially impermeable mass is not inhibited by the cementitious material;
   (b) an organophilic surfactant; and
   (c) an oleaginous fluid, wherein upon setting the wellbore servicing composition forms the substantially impermeable mass, wherein the oleaginous fluid is present in a ratio of magnesium oxide and the chloride or phosphate salt:oleaginous fluid from about 95:5 to about 50:50 by volume.

14. The composition of claim 13 wherein the chloride salt comprises magnesium chloride and the phosphate salt comprises sodium phosphate, potassium phosphate, ammonium phosphate or combinations thereof.

15. The composition of claim 13 wherein the organophilic surfactant comprises a quaternary amide, a quaternary amide ester, or combinations thereof.

16. The composition of claim 13 wherein the surfactant is present in an amount of from about 0.25% to about 5% based on the combined weight of the metal oxide and chloride or phosphate salt.

17. The composition of claim 13 wherein the oleaginous fluid comprises petroleum oil, natural oil, synthetically derived oil, an alpha olefin, an internal olefin, an ester, a diester of carbonic acid, a paraffin, kerosene oil, diesel oil, mineral oil or combinations thereof.

18. A wellbore servicing composition comprising:
   (a) a cementitious material consisting essentially of magnesium oxide and magnesium chloride, wherein the ratio of the magnesium oxide to the magnesium chloride is no more than about 2:1 by weight, and wherein formation of a substantially impermeable mass is not inhibited by the cementitious material;
   (b) an organophilic surfactant;
   (c) water; and an oleaginous fluid, wherein the organophilic surfactant is present in an amount of from about 0.25% to about 5% based on the combined weight of the magnesium oxide and magnesium chloride, and wherein the oleaginous fluid is present in a ratio of magnesium oxide and magnesium chloride:oleaginous fluid from about 95:5 to about 50:50 by volume and wherein upon setting the wellbore servicing composition forms the substantially impermeable mass.

19. The composition of claim 5 wherein the quaternary amide or the quaternary amide ester comprises stearamidopropalkonium chloride.

20. A wellbore servicing composition comprising:
(a) a cementitious material comprising an alkaline earth metal oxide and a soluble salt, wherein the alkaline earth metal oxide comprises magnesium oxide, wherein the ratio of the magnesium oxide to the soluble salt is no more than about 2:1 by weight;
(b) a surfactant; and
(c) an oleaginous fluid, wherein upon setting the wellbore servicing composition forms a substantially impermeable mass, wherein the oleaginous fluid is present in a ratio of magnesium oxide and soluble salt:oleaginous fluid from about 95:5 to about 50:50 by volume.

21. The composition of claim 20 wherein the surfactant comprises an organophilic surfactant present in an amount of from about 0.25% to about 5% based on the combined weight of the magnesium oxide and the soluble salt.

* * * * *